(12) United States Patent
Barraud et al.

(10) Patent No.: US 8,172,056 B2
(45) Date of Patent: May 8, 2012

(54) DISENGAGEABLE PULLEY DEVICE

(75) Inventors: Pierre-Julien Barraud, Rochecorbon (FR); Gwenael Hingouet, Saint Cyr sur Loire (FR); Jean-Philippe Gaborel, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 1046 days.

(21) Appl. No.: 12/070,727

(22) Filed: Feb. 20, 2008

(65) Prior Publication Data

US 2008/0230341 A1 Sep. 25, 2008

(30) Foreign Application Priority Data

Feb. 27, 2007 (FR) ...................................... 07 53542

(51) Int. Cl.
*F16D 41/07* (2006.01)
*F16H 55/36* (2006.01)

(52) U.S. Cl. .............. 192/45.1; 192/110 B; 192/113.32; 474/170; 474/199

(58) Field of Classification Search .................. None
See application file for complete search history.

(56) References Cited

U.S. PATENT DOCUMENTS

| | | | |
|---|---|---|---|
| 1,368,068 A | 2/1921 | Stein et al. |
| 2,055,524 A | 9/1936 | Milford |
| 2,140,975 A | 12/1938 | Welch |
| 3,008,362 A | 11/1961 | Tucker |
| 3,258,962 A | 7/1966 | Dahle |
| 3,365,967 A | 1/1968 | Friedrich |
| 3,965,565 A | 6/1976 | Fujii |
| 4,018,318 A | 4/1977 | Hallerberg |
| 4,020,720 A | 5/1977 | Fujii |
| 4,029,186 A | 6/1977 | De Gennes |
| 4,046,238 A | 9/1977 | Mendoza-Orozco |
| 4,119,625 A | 10/1978 | Schmidlin |
| 4,175,453 A | 11/1979 | Exner et al. |
| 4,281,539 A | 8/1981 | Keller |
| 4,319,220 A | 3/1982 | Pappas et al. |
| 4,435,890 A | 3/1984 | Ernst et al. |
| 4,438,901 A | 3/1984 | Reneau et al. |
| 4,478,595 A | 10/1984 | Hayakawa et al. |

(Continued)

FOREIGN PATENT DOCUMENTS

DE 1525294 2/1972

(Continued)

OTHER PUBLICATIONS

International Preliminary Report on Patentability for PCT/FR2006/000908, Oct. 23, 2007 (16 pages).

(Continued)

*Primary Examiner* — Richard M. Lorence
(74) *Attorney, Agent, or Firm* — Meyertons, Hood, Kivlin, Kowert & Goetzel, P.C.; Eric B. Meyertons (57) ABSTRACT

Disengageable pulley device comprising a pulley mounted on a shaft by means of a rolling bearing and of a freewheel, the pulley comprising a rim mounted on the periphery of a one-piece outer race of substantially tubular shape comprising, on an inner surface, at least one raceway for rolling elements and at least one contact seat of cylindrical revolution for lock-up elements of the freewheel, a one-piece inner race forming a torque transmission shaft and including, on an outer surface coming opposite the outer race, at least one raceway for the rolling elements and at least one contact seat of cylindrical revolution for the lock-up elements of the freewheel.

9 Claims, 3 Drawing Sheets

U.S. PATENT DOCUMENTS

| | | | |
|---|---|---|---|
| 4,494,637 A | 1/1985 | Gotoda et al. |
| 4,497,523 A | 2/1985 | Lederman |
| 4,505,484 A | 3/1985 | Ohkuma et al. |
| 4,523,742 A | 6/1985 | Reneau |
| 4,528,895 A | 7/1985 | Nakamura |
| 4,541,744 A | 9/1985 | Lederman |
| 4,601,374 A | 7/1986 | Ladin |
| 4,602,875 A | 7/1986 | Doerr et al. |
| 4,608,741 A | 9/1986 | Mallet |
| 4,641,523 A | 2/1987 | Andreasson |
| 4,699,530 A | 10/1987 | Satoh et al. |
| 4,708,036 A | 11/1987 | Vossbrinck |
| 4,722,617 A | 2/1988 | Stella et al. |
| 4,732,494 A | 3/1988 | Guers et al. |
| 4,815,867 A | 3/1989 | Ladin |
| 4,854,436 A | 8/1989 | Lassiaz et al. |
| 4,867,292 A | 9/1989 | Hartig |
| 4,872,768 A | 10/1989 | Brandenstein et al. |
| 4,874,073 A | 10/1989 | Tagawa |
| 4,881,629 A | 11/1989 | Gay et al. |
| 4,915,512 A | 4/1990 | Hilby et al. |
| 4,939,936 A | 7/1990 | Spooner et al. |
| 4,946,295 A | 8/1990 | Hajzler |
| 4,957,133 A | 9/1990 | Linz et al. |
| 4,970,945 A | 11/1990 | Schmidt |
| 4,998,453 A | 3/1991 | Walton |
| 5,008,647 A | 4/1991 | Brunt et al. |
| 5,017,741 A | 5/1991 | Brown et al. |
| 5,018,384 A | 5/1991 | Hayashi et al. |
| 5,033,013 A | 7/1991 | Kato et al. |
| 5,051,693 A | 9/1991 | Brauer |
| 5,072,181 A | 12/1991 | Burger |
| 5,198,738 A | 3/1993 | Blaser et al. |
| 5,264,790 A | 11/1993 | Moretti et al. |
| 5,372,435 A | 12/1994 | Genero et al. |
| 5,377,580 A | 1/1995 | Merklein et al. |
| 5,431,413 A | 7/1995 | Hajzler |
| 5,454,585 A | 10/1995 | Dronen et al. |
| 5,470,279 A | 11/1995 | Brandenstein et al. |
| 5,523,681 A | 6/1996 | Hajzler et al. |
| 5,570,871 A | 11/1996 | Westerfield |
| 5,575,366 A * | 11/1996 | Zenmei et al. ................. 192/45 |
| 5,575,568 A | 11/1996 | Rigaux et al. |
| 5,592,401 A | 1/1997 | Kramer |
| 5,598,913 A | 2/1997 | Monahan et al. |
| 5,620,209 A | 4/1997 | Sauer |
| 5,657,544 A | 8/1997 | Ota et al. |
| 5,664,653 A * | 9/1997 | Kurita et al. ................. 192/45.1 |
| 5,713,577 A | 2/1998 | Lannert et al. |
| 5,721,539 A | 2/1998 | Goetzl |
| 5,780,731 A | 7/1998 | Matsui et al. |
| 5,845,230 A | 12/1998 | Lamberson |
| 5,865,288 A | 2/1999 | Thomire et al. |
| 5,877,431 A | 3/1999 | Hirano |
| 6,011,491 A | 1/2000 | Goetzl |
| 6,013,007 A | 1/2000 | Root et al. |
| 6,025,737 A | 2/2000 | Patel et al. |
| 6,035,990 A | 3/2000 | Peschke |
| 6,043,643 A | 3/2000 | Message et al. |
| 6,056,446 A | 5/2000 | Welter et al. |
| 6,083,130 A | 7/2000 | Mevissen et al. |
| 6,109,624 A | 8/2000 | Message et al. |
| 6,129,643 A | 10/2000 | Tamagawa et al. |
| 6,155,543 A | 12/2000 | Solomond et al. |
| 6,160,480 A | 12/2000 | Su-yueh |
| 6,196,552 B1 | 3/2001 | Peterson et al. |
| 6,241,257 B1 | 6/2001 | Hauck et al. |
| 6,267,512 B1 | 7/2001 | Beghini et al. |
| 6,288,533 B1 | 9/2001 | Haeberli et al. |
| 6,304,079 B1 | 10/2001 | Kenjo et al. |
| 6,310,450 B1 | 10/2001 | Arrigo |
| 6,323,640 B1 | 11/2001 | Forestiero et al. |
| 6,328,148 B2 | 12/2001 | Winkelmann et al. |
| 6,338,576 B1 | 1/2002 | Girardin et al. |
| 6,357,926 B1 | 3/2002 | Hauck et al. |
| 6,378,678 B1 | 4/2002 | Armitage et al. |
| 6,415,900 B1 | 7/2002 | Lopez et al. |
| 6,417,075 B1 | 7/2002 | Haberger et al. |
| 6,539,336 B1 | 3/2003 | Vock et al. |
| 6,550,755 B2 | 4/2003 | Erhhardt et al. |
| 6,558,043 B2 | 5/2003 | Beghini et al. |
| 6,564,480 B1 | 5/2003 | Tomita et al. |
| 6,593,733 B1 | 7/2003 | Nicot |
| 6,611,138 B2 | 8/2003 | Vasiloiu |
| 6,612,749 B2 | 9/2003 | Arnault et al. |
| 6,666,784 B1 | 12/2003 | Iwamoto et al. |
| 6,702,085 B1 | 3/2004 | Ponson |
| 6,712,366 B1 | 3/2004 | Cargill |
| 6,746,352 B1 | 6/2004 | Poiret et al. |
| 6,814,496 B2 | 11/2004 | Beghini et al. |
| 6,837,116 B2 | 1/2005 | Desbiolles |
| 6,889,794 B2 | 5/2005 | Higashira et al. |
| 6,908,229 B2 | 6/2005 | Landrieve et al. |
| 7,033,080 B2 | 4/2006 | Landrieve et al. |
| 7,033,293 B2 | 4/2006 | Serkh |
| 7,114,853 B2 | 10/2006 | Debrailly et al. |
| 7,117,986 B2 | 10/2006 | Thomire et al. |
| 7,222,709 B2 | 5/2007 | Arnault |
| 7,228,951 B2 | 6/2007 | Arnault |
| 7,275,462 B2 | 10/2007 | Faus et al. |
| 7,290,351 B2 | 11/2007 | Nairfeix et al. |
| 7,367,714 B2 | 5/2008 | Niarfeix et al. |
| 7,429,133 B2 | 9/2008 | Gallion et al. |
| 2001/0000285 A1* | 4/2001 | Tanaka ........................ 192/45 |
| 2002/0026839 A1 | 3/2002 | Lehtovaara |
| 2002/0038193 A1 | 3/2002 | Grunberg et al. |
| 2002/0111767 A1 | 8/2002 | Lueschow et al. |
| 2002/0112555 A1 | 8/2002 | Chikaraishi et al. |
| 2002/0125113 A1 | 9/2002 | Bhakta et al. |
| 2002/0126926 A1 | 9/2002 | Ohtsuki et al. |
| 2002/0134974 A1* | 9/2002 | Fujiwara et al. ............. 254/391 |
| 2002/0167306 A1 | 11/2002 | Zalunardo et al. |
| 2002/0170812 A1 | 11/2002 | Calkin et al. |
| 2002/0190709 A1 | 12/2002 | Frederick et al. |
| 2003/0002764 A1 | 1/2003 | Pflugner et al. |
| 2003/0007631 A1 | 1/2003 | Bolognesi et al. |
| 2003/0085091 A1* | 5/2003 | Ichihara et al. .................. 192/45 |
| 2003/0137091 A1 | 7/2003 | Chesne |
| 2004/0013334 A1 | 1/2004 | Landrieve et al. |
| 2004/0015307 A1 | 1/2004 | Heisenberg |
| 2004/0097313 A1 | 5/2004 | Singer |
| 2004/0120620 A1 | 6/2004 | Landrieve |
| 2004/0126043 A1 | 7/2004 | Ito |
| 2004/0154895 A1 | 8/2004 | Thomire et al. |
| 2004/0235599 A1 | 11/2004 | Ozorak et al. |
| 2004/0254710 A1 | 12/2004 | Yano |
| 2005/0008276 A1 | 1/2005 | Beghini et al. |
| 2005/0026729 A1 | 2/2005 | Schenk et al. |
| 2005/0124447 A1 | 6/2005 | Message et al. |
| 2005/0265646 A1 | 12/2005 | Arnault |
| 2006/0011445 A1 | 1/2006 | Bussit et al. |
| 2006/0104558 A1 | 5/2006 | Gallion et al. |
| 2006/0115443 A1 | 6/2006 | Gesztesi et al. |
| 2006/0188190 A1 | 8/2006 | Schmidl et al. |
| 2006/0227007 A1 | 10/2006 | Landrieve |
| 2006/0243150 A1 | 11/2006 | Landrieve |
| 2007/0025655 A1 | 2/2007 | Barraud et al. |
| 2007/0053622 A1 | 3/2007 | Gallion et al. |
| 2007/0074945 A1 | 4/2007 | Ponson et al. |
| 2008/0031562 A1 | 2/2008 | Poulle |
| 2008/0036454 A1 | 2/2008 | Landrieve |
| 2008/0038564 A1 | 2/2008 | Bruel et al. |
| 2008/0090686 A1 | 4/2008 | Gardelle |
| 2008/0132365 A1 | 6/2008 | Boussaguet et al. |
| 2008/0152272 A1 | 6/2008 | Debrailly et al. |
| 2008/0167150 A1 | 7/2008 | Gaborel et al. |
| 2008/0248905 A1 | 10/2008 | Descombes et al. |

FOREIGN PATENT DOCUMENTS

| | | |
|---|---|---|
| DE | 2457863 | 6/1975 |
| DE | 2729699 | 12/1978 |
| DE | 3534462 | 4/1987 |
| DE | 3910498 | 10/1990 |
| DE | 4228899 | 3/1994 |
| DE | 9418459 | 2/1995 |
| DE | 29708535 | 8/1997 |
| DE | 19637585 | 3/1998 |

| | | |
|---|---|---|
| DE | 19809074 | 1/1999 |
| DE | 19836191 | 2/2000 |
| DE | 10041095 | 6/2001 |
| DE | 10011820 | 9/2001 |
| DE | 10035488 | 1/2002 |
| DE | 10036765 | 2/2002 |
| DE | 10042677 | 3/2002 |
| DE | 10058623 | 6/2002 |
| DE | 10148388 | 4/2003 |
| DE | 102004013669 | 10/2005 |
| DE | 4300083 | 11/2008 |
| EP | 0375019 | 6/1990 |
| EP | 0395783 | 11/1990 |
| EP | 0399855 | 11/1990 |
| EP | 0511105 | 10/1992 |
| EP | 0520853 | 12/1992 |
| EP | 0823267 | 2/1998 |
| EP | 0930505 | 7/1999 |
| EP | 0992797 | 4/2000 |
| EP | 1120584 | 8/2001 |
| EP | 1146244 | 10/2001 |
| EP | 1236934 | 9/2002 |
| EP | 1445129 | 8/2004 |
| EP | 1491786 | 12/2004 |
| FR | 2375484 | 12/1977 |
| FR | 2574501 | 6/1986 |
| FR | 2577291 | 8/1986 |
| FR | 2602872 | 2/1988 |
| FR | 2611244 | 8/1988 |
| FR | 2655735 | 6/1991 |
| FR | 2667947 | 4/1992 |
| FR | 2688560 | 9/1993 |
| FR | 2703450 | 10/1994 |
| FR | 2744506 | 8/1997 |
| FR | 2751392 | 1/1998 |
| FR | 2772444 | 6/1999 |
| FR | 2799694 | 4/2001 |
| FR | 2819864 | 7/2002 |
| FR | 2848663 | 6/2004 |
| FR | 2856759 | 12/2004 |
| FR | 2863706 | 6/2005 |
| FR | 2867421 | 9/2005 |
| FR | 2882139 | 8/2006 |
| GB | 1580301 | 12/1980 |
| GB | 2201745 | 9/1988 |
| GB | 2217663 | 1/1989 |
| GB | 2259962 | 3/1993 |
| GB | 2313417 | 11/1997 |
| GB | 2347906 | 9/2000 |
| GB | 2366871 | 3/2002 |
| JP | 62278352 | 12/1987 |
| JP | 10030693 | 2/1988 |
| JP | 63172052 | 7/1988 |
| JP | 06058770 | 3/1994 |
| JP | 6213251 | 8/1994 |
| JP | 08054205 | 2/1996 |
| JP | 09292006 | 4/1996 |
| JP | 9072394 | 3/1997 |
| JP | 09229097 | 9/1997 |
| JP | 11247972 | 9/1999 |
| JP | 2000161471 | 6/2000 |
| JP | 2000209889 | 7/2000 |
| JP | 2000241197 | 9/2000 |
| JP | 2001289291 | 10/2001 |
| JP | 2004011827 | 1/2004 |
| JP | 2005282856 | 10/2005 |
| JP | 2006183755 | 7/2006 |
| WO | 0142809 | 5/2001 |
| WO | 02052280 | 7/2002 |
| WO | 02071076 | 9/2002 |
| WO | 03067107 | 8/2003 |
| WO | 2004005937 | 1/2004 |

OTHER PUBLICATIONS

Written Opinion of the International Search Authority for PCT/FR2006/000908, Oct. 22, 2007 (14 pages).
International Search Report for PCT/FR2006/002769, mailed Apr. 25, 2007 (4 pages).
International Preliminary Report on Patentability for PCT/FR2006/002769, Jun. 24, 2008 (12 pages).
Written Opinion of the International Search Authority for PCT/FR2006/002769, Jun. 20, 2008 (10 pages).
International Search Report for PCT/FR2007/000001, mailed Oct. 16, 2007 (4 pages).
Allan, Roger, "Coil-Based Micromachined Sensor Measures Speed and Position for Automotive Applications", Electronic Design, Penton Publishing, Cleveland, OH, US, vol. 44, No. 26, Dec. 16, 1996, pp. 34, 35, and 37.
International Search Report PCT/FR 02/03077, mailed Jan. 21, 2003 (4 pages).
International Preliminary Examination Report for PCT/FR02/03077, Apr. 24, 2003 (4 pages)
U.S. Patent and Trademark Office, "Communication" for U.S. Appl. No. 10/488,911, mailed Dec. 10, 2007.
U.S. Patent and Trademark Office, "Communication" for U.S. Appl. No. 10/488,911, mailed Apr. 23, 2008.
U.S. Patent and Trademark Office, "Communication" for U.S. Appl. No. 10/488,911, mailed Aug. 19, 2008.
International Search Report for PCT/FR02/03867, mailed Apr. 4, 2003 (6 pages).
International Preliminary Examination Report for PCT/FR02/03867, Mar. 12, 2004 (17 pages).
U.S. Patent and Trademark Office, "Communication" for U.S. Appl. No. 10/495,496, mailed Jun. 23, 2008.
U.S. Patent and Trademark Office, "Communication" for U.S. Appl. No. 10/965,679, mailed Jan. 15, 2008.
U.S. Patent and Trademark Office, "Communication" for U.S. Appl. No. 10/965,679, mailed May 14, 2008.
International Search Report for PCT/FR03/02113, mailed Nov. 27, 2003 (4 pages).
International Preliminary Examination Report for PCT/FR03/02113, Apr. 26, 2004 (8 pages).
U.S. Patent and Trademark Office, "Communication" for U.S. Appl. No. 11/175,013, mailed Apr. 2, 2007.
U.S. Patent and Trademark Office, "Communication" for U.S. Appl. No. 11/175,013, mailed Aug. 16, 2007.
U.S. Patent and Trademark Office, "Communication" for U.S. Appl. No. 11/175,013, mailed Dec. 17, 2007.
U.S. Patent and Trademark Office, "Communication" for U.S. Appl. No. 11/175,013, mailed May 28, 2008.
U.S. Patent and Trademark Office, "Communication" for U.S. Appl. No. 11/175,013, mailed Sep. 18, 2008.
Written Opinion of the International Search Authority for PCT/FR2004/000639, Oct. 26, 2004 (5 pages).
U.S. Patent and Trademark Office, "Communication" for U.S. Appl. No. 10/548,866, mailed Oct. 9, 2007.
International Search Report for PCT/FR2004/001557, mailed Jan. 5, 2005 (6 pages).
Written Opinion of the International Search Authority for PCT/FR2004/001557, Jan. 3, 2005 (11 pages).
International Preliminary Report on Patentability for PCT/FR2004/001557, Jan. 3, 2006 (13 pages).
International Search Report for PCT/FR04/001609, mailed Dec. 3, 2004 (6 pages).
Written Opinion of the International Search Authority for PCT/FR2004/001609, Dec. 2, 2004 (11 pages).
International Preliminary Report on Patentability for PCT/FR2004/001609, Jan. 30, 2006 (13 pages).
U.S. Patent and Trademark Office, "Communication" for U.S. Appl. No. 11/361,306, mailed Aug. 19, 2008.
International Search Report for PCT/FR2004/002542, mailed Jun. 28, 2005 (6 pages).
International Preliminary Report on Patentability for PCT/FR2004/002542, Oct. 25, 2005 (11 pages).
U.S. Patent and Trademark Office, "Communication" for U.S. Appl. No. 11/536,105, mailed Apr. 20, 2007.
U.S. Patent and Trademark Office, "Communication" for U.S. Appl. No. 11/536,105, mailed Oct. 3, 2007.
U.S. Patent and Trademark Office, "Communication" for U.S. Appl. No. 11/536,105, mailed Aug. 1, 2008.

U.S. Patent and Trademark Office, "Communication" for U.S. Appl. No. 11/484,321, mailed Sep. 17, 2008.

International Search Report for PCT/FR2006/000349, mailed Jun. 26, 2006 (4 pages).

Written Opinion of the International Search Authority for PCT/FR2006/000349, Sep. 3, 2007 (10 pages).

French Preliminary Search Report for FR 0753542, Nov. 7, 2007.

* cited by examiner

DISENGAGEABLE PULLEY DEVICE

BACKGROUND OF THE INVENTION

1. Field of the Invention

The invention relates to the field of freewheels and more particularly to the field of disengageable pulleys equipped with freewheels used, for example, to drive alternators in a motor vehicle.

2. Description of the Relevant Art

Disengageable pulleys are being increasingly used to overcome the detrimental effects of acyclic running or sudden engine accelerations or decelerations which occur in combustion engines, in particular at low engine speeds and especially in diesel engines.

In these conditions, the drive belt, which is connected to the engine by the crankshaft pulley, decelerates sharply while the driven pulley, the alternator pulley for example, has a tendency, as a result of inertia, to continue to turn at the same speed. If there is a rigid coupling between the pulley and alternator shaft, the belt is subjected to very considerable stresses during these instantaneous speed variations, with detrimental effects such as abnormal belt fatigue and the associated risks of breakage, slipping of the belt on the pulley, or else vibration of the belt strands between the pulleys. Attempts have thus been made to attenuate these phenomena by incorporating between the driven pulley and the driven shaft a freewheel which allows the pulley to be temporarily uncoupled from the shaft if the pulley suddenly decelerates.

Document JP 11-247 972 discloses a disengageable pulley with a freewheel arranged between two rows of balls. The inner races of the bearing and of the freewheel, along with the shaft on which these parts are mounted, are separate components and hence relatively costly to manufacture separately, to manage and to assemble. The freewheel is of the roller type and requires that lock-up ramps or faces are machined and that each roller is combined with an individual bearing spring, a situation which proves to be relatively costly.

Document JP 09-229 097 describes a disengageable pulley comprising a row of balls and a roller-type freewheel with an inner race mounted on a shaft between a nut and a spacer.

Document JP 09-292 006 discloses a disengageable pulley with a row of balls and a row of cams. The inner race is mounted on a sleeve, itself mounted on the shaft, thus increasing the number of parts and reducing the radial gap available between the races, a situation which may lead to using balls and cams of smaller dimensions but in larger numbers to obtain an equivalent load capacity for the balls and an equivalent torque transfer capacity for the cams. This results in increased manufacturing costs.

SUMMARY OF THE INVENTION

Embodiments, described herein seek, in particular, to provide a disengageable pulley which is relatively insensitive to torsion, has a small number of parts, entails a reduced manufacturing cost, is simple to mount and has a high load capacity.

The disengageable pulley device includes a pulley mounted on a shaft by means of a rolling bearing and of a freewheel, the pulley comprising a rim having an active outer surface intended to be in contact with a belt. The rim of the pulley is mounted on the periphery of a one-piece outer race of substantially tubular shape comprising on its inner surface at least one raceway for rolling elements and at least one contact seat of cylindrical revolution for lock-up elements of the freewheel. The device additionally includes a one-piece inner race forming a torque transmission shaft. The inner race includes, on its outer surface coming opposite the outer race, at least one raceway for the rolling elements and at least one contact seat of cylindrical revolution for the lock-up elements of the freewheel. The rolling bearing includes two rows of rolling elements. One row of rolling elements can be arranged between the freewheel and the other row of rolling elements.

There is thus made available a disengageable pulley which, owing to its construction, is extremely insensitive to torsion, resulting for example from a highly tensioned belt. The one-piece inner race is particularly robust and limits the number of parts. The inner and outer races cooperating with cams are provided with cylindrical seats of revolution which are simple and economic to manufacture. By virtue of the high load capacity of the disengageable pulley, it is possible to standardize the subassembly consisting of inner race, outer race, bearing and freewheel for a large number of applications while at the same time using a specific pulley rim which is well suited to the intended application. It is particularly simple to assemble the various elements.

The fact that the inner race forms the shaft makes it possible either to greatly reduce the radial dimension of the assembly or to benefit from more radial space for the rolling elements and the lock-up elements, resulting in elements which have larger dimensions and which can be smaller in number, something which proves to be particularly cost-effective. The raceways and the cylindrical contact seats for the lock-up elements can be formed during one and the same operation on the same machines that are used for machining, thus ensuring excellent concentricity with beneficial effects in terms of the operation of the device and a reduction in vibrations and wear. Furthermore, the heat treatment of the freewheel and the grinding of tracks therein can be integrated with the procedures of making the raceways.

In one embodiment, the axial width of the outer race is greater than the axial width of the active surface of the rim of the pulley. It is thus possible to reduce the overall size of the assembly, the outer race being able to have a much smaller diameter than the rim.

In one embodiment, the rim of the pulley is arranged axially on that side of the outer race where the raceway or raceways are situated. The active outer surface of the rim of the pulley and the rolling bearing are arranged axially at the same level, resulting in an absence of skew moment between the races and in a good distribution of the forces in the rolling bearing.

In one embodiment, the rolling elements include balls. The balls can cooperate with raceways of generally toroidal shape and also ensure that the device cannot be accidentally disassembled. The balls can be maintained at a uniform circumferential spacing by a cage.

In one embodiment, the lock-up elements include cams. The cams have an outer surface for contact with a bore of the outer race and an inner surface for contact with an outer seat of the inner race.

The cams can be of the "engaging" type. Engaging cams are to be understood as cams which through their construction have a tendency, under the effect of the centrifugal forces when the freewheel turns, to pivot in the direction which promotes contact between said cams and the two contact seats of the races so as to promote an extremely quick changeover from uncoupled operation to torque transmission operation.

The freewheel can include a cage for keeping cams in place. The freewheel can include a return spring, for example a band spring, arranged in particular inside the cage. The cage and, where appropriate, the spring includes compartments in which the cams are arranged.

In one embodiment, the inner race has a cylindrical outer profile with a substantially uniform diameter outside the region of the raceways. The inner race can be manufactured very economically.

In one embodiment, the outer race has a cylindrical outer profile. The outer surface of the outer race is in contact with the bore of the rim, for example by press-fitting or else adhesive bonding. The outer race is simple and economic to produce.

In one embodiment, the inner raceways are formed directly on the shaft. This results in increased radial compactness and simpler assembly.

In one embodiment, the rolling bearing and the active outer surface of the rim are symmetrical with respect to a common radial plane.

In one embodiment, the device includes a seal arranged between the freewheel and the rolling bearing. The seal can take the form of a flange providing a narrow passage or else the form of a contact seal with a lip which rubs against a seat, preferably a ground seat, of the opposed race. The seal can be press-fitted into the race which supports it or else be installed in a groove. The seal allows the freewheel and the rolling bearing to retain their lubricant. The lubricant of the rolling bearing and that of the freewheel can be different, for example having a viscosity which is adapted to each function.

The inner surface of the inner race can be splined in part for the purpose of coupling the inner race with another part by screwing, the splines serving to accommodate a screwing torque exerted by an assembly tool. The inner surface of the inner race can be provided with a threaded axial end so that it can be mounted on another part.

In one embodiment, the device includes seals arranged at the far ends of the inner and outer races, for example in grooves in the outer race while forming a seal with a seat of the inner race.

In one embodiment, the freewheel is maintained axially in position by means of circlips arranged in part in grooves formed in the surface of one of the races. The circlips can be designed to cooperate with radial edge flanges of the cage of the freewheel.

The total mass of the disengageable pulley can be reduced. The length of the rim of the pulley can be reduced to its functional part which cooperates with the belt, for example to the active outer surface to which are added two edge flanges of small axial dimension which prevent a disengagement of the belt.

BRIEF DESCRIPTION OF THE DRAWINGS

The present invention will be better understood on reading the detailed description of an embodiment given by way of non-limiting example and illustrated by the appended drawings, in which.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

Figure 1:
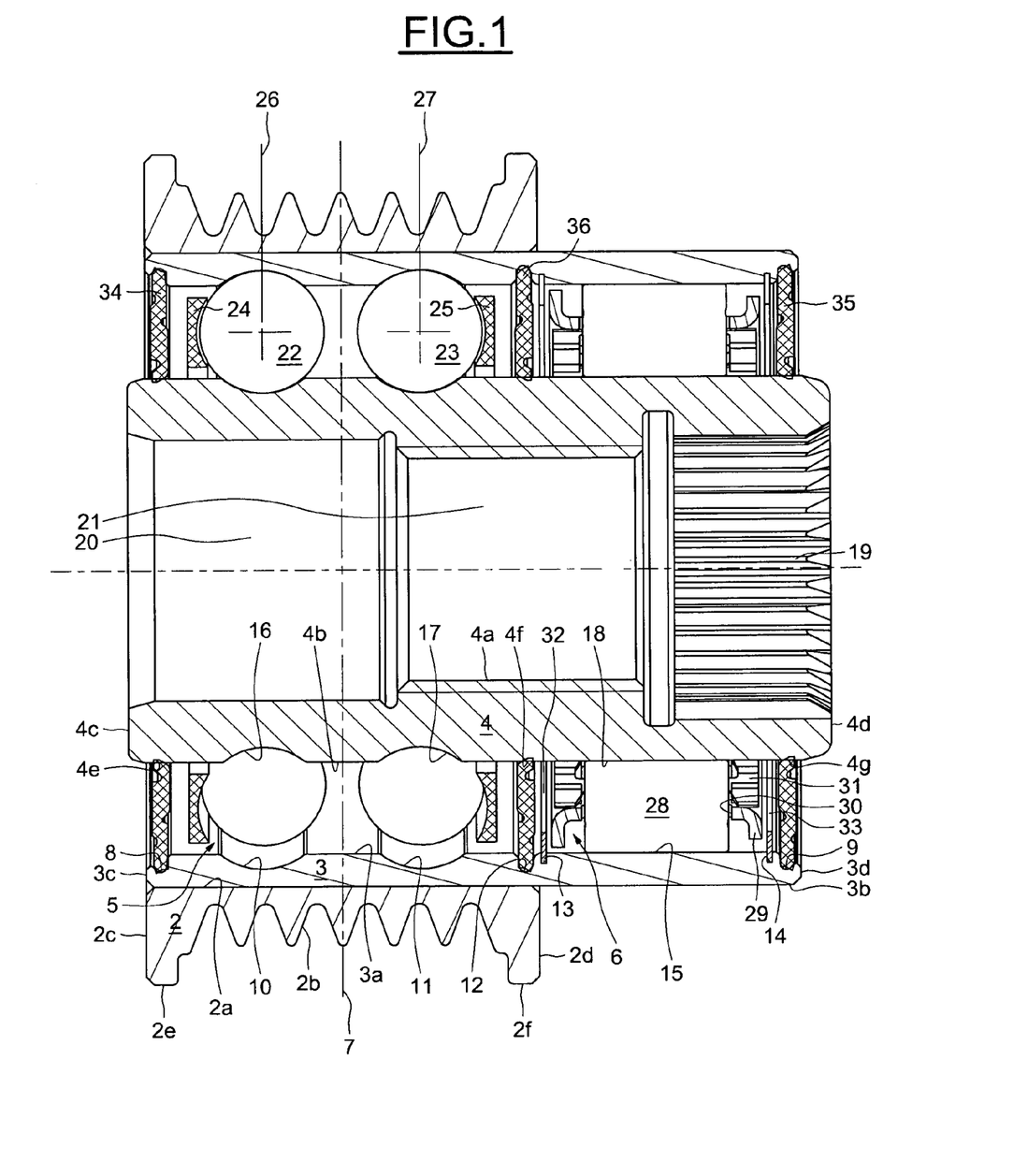
FIG. 1 is a view in axial section of a disengageable pulley device.
Figure 2:
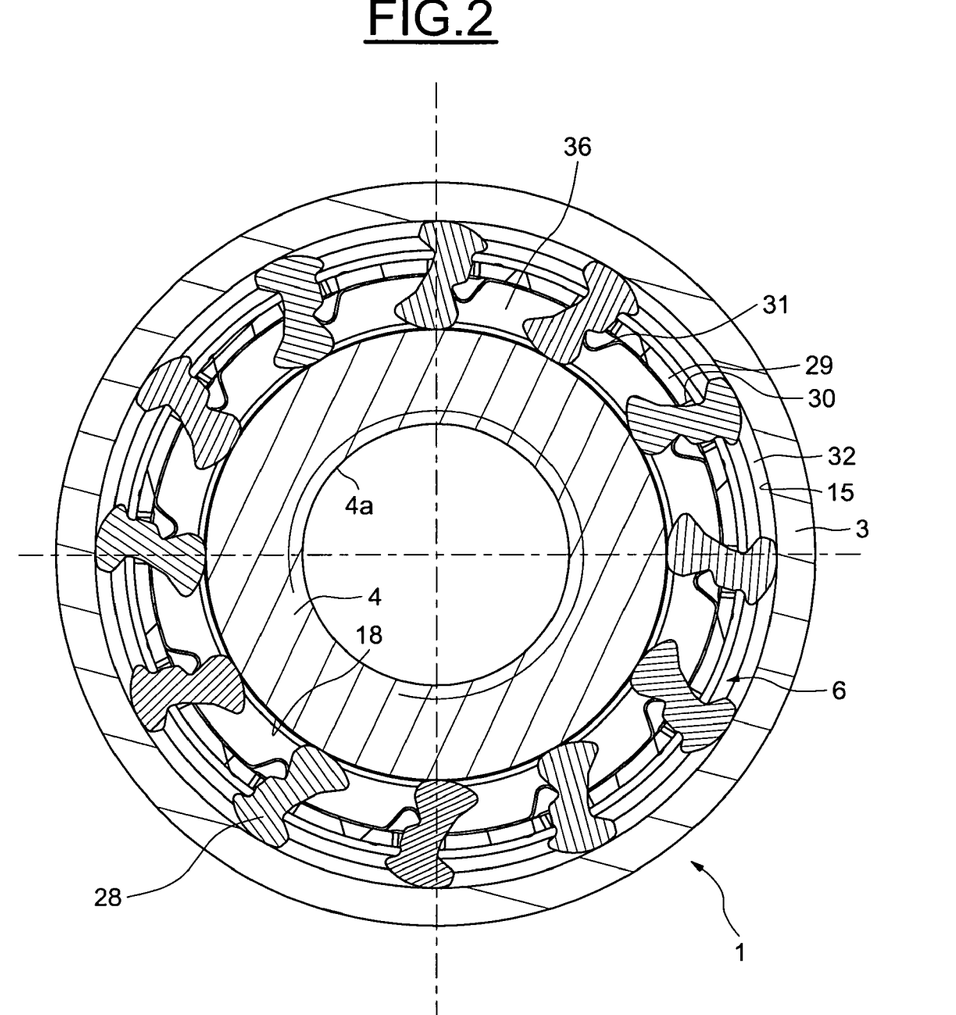
FIG. 2 is a view in cross section of the disengageable pulley shown in FIG. 1, taken at the level of the freewheel.
Figure 3:
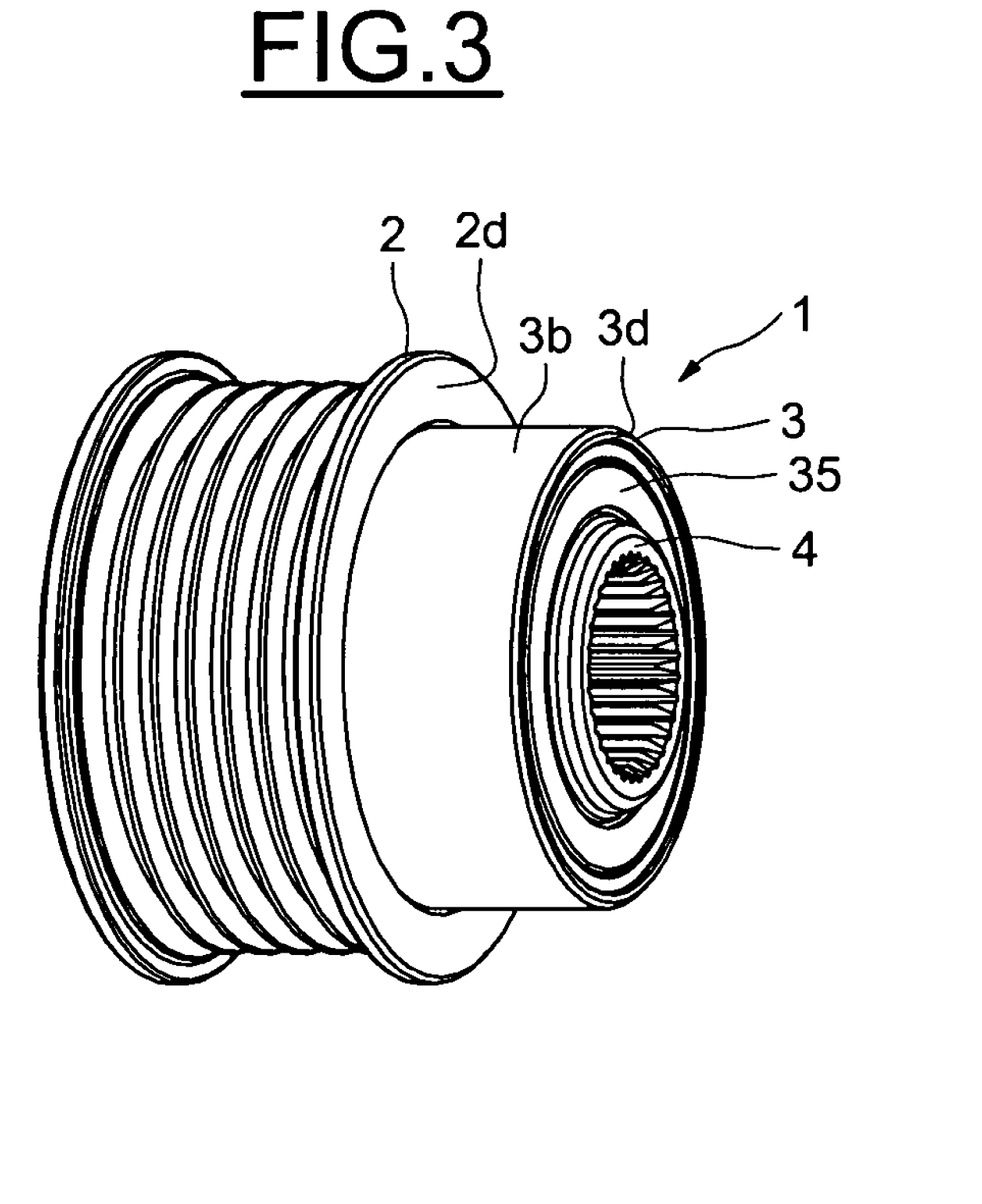
FIG. 3 is a perspective view of the disengageable pulley shown in FIG. 1.

As can be seen from the figures, the disengageable pulley 1 includes a rim 2, an outer race 3, an inner race 4, a rolling bearing 5 and a freewheel 6. The rolling bearing 5 and the freewheel 6 are arranged between the outer race 3 and inner race 4.

The rim 2 takes the form of a one-piece component made of synthetic material or metal, for example a light alloy. The rim 2 includes a bore 2a, an active outer surface 2b provided with circular grooves and ribs which are intended to cooperate with a belt (not shown), in particular a poly-V-type belt, and two opposed radial end surfaces 2c and 2d extending from the ends of the bore 2a. At each of its axial ends, the pulley is provided with flanks 2e and 2f whose diameter is slightly larger than the diameter of the active surface 2b, the two flanks ensuring that the belt is correctly guided laterally on the pulley. The rim 2 is symmetrical with respect to a radial plane 7.

The outer race 3 has a bore 3a, a cylindrical outer surface 3b of revolution and two lateral radial surfaces 3c and 3d. The radial surface 2c of the rim 2 and the radial surface 3c of the outer race 3 are coplanar. The outer race 3 takes the form of a tube portion, for example a steel tube portion. The outer race 3 is made in one piece. The bore 2a of the rim 2 is in contact with part of the outer surface 3b of the outer race 3 and is fastened, for example, with an interference fit, something which proves to be particularly cost-effective. The lateral surface 3d of the outer race 3 is situated axially beyond the lateral surface 2d of the rim 2.

The bore 3a of the outer race 3 takes the form of a generally cylindrical surface of revolution. However, grooves 8 and 9 are formed at the ends of the bore 3a, in the vicinity of the lateral surfaces 3c and 3d respectively. Raceway tracks 10 and 11 of generally toroidal shape are formed in the bore 3a, symmetrically with respect to the radial plane 7.

Furthermore, small-dimension annular grooves 12, 13 and 14 are also formed in the bore 3a between the raceway 11 and the groove 9. Between the raceway 11 and the groove 9 is also formed a cylindrical ground surface 15 of revolution designed to cooperate with the freewheel 6, while the raceways 10 and 11 are designed to cooperate with the rolling bearing 5. The ground surface 15 is arranged between the grooves 13 and 14.

The inner race 4 takes the form of a generally tubular-shaped portion. The inner race 4 is made in one piece. The inner race 4 has a bore 4a, provided with a thread, an outer surface 4b and two radial end surfaces 4c and 4d. In the example illustrated, the inner race 4 has a greater length than the outer race 3, the radial surfaces 4c and 4d being respectively arranged beyond the radial surfaces 3c and 3d of the outer race 3.

The outer surface 4b of the inner race 4 takes the form of a generally cylindrical surface of revolution. Two raceways 16 and 17 of generally toroidal shape are formed in the inner race 4, starting from the outer surface 4b. The raceways 16 and 17 are situated in the same radial plane as the raceways 10 and 11. The raceways 16 and 17 are symmetrical with respect to the radial plane 7.

Between the end surface 4c and the raceway 16, the inner race 4 includes a ground seat 4e, substantially at the same axial level as the groove 8 in the outer race 3. Another ground seat 4f is formed on the outer surface 4b substantially at the axial level of the groove 12. A ground seat 4g is formed on the outer surface 4b axially at the level of the groove 9. A ground seat 18 having a significantly greater axial length than the length of the seats 4e, 4f and/or 4g is formed on the outer surface 4b, substantially at the axial level of the seat 15, in order to cooperate with the freewheel 6. Advantageously, the ground portions 4f, 18 and 4g form a single cylindrical seat of continuous diameter.

The bore 4a of the inner race 4 includes a splined end 19 so as to allow a coupling with a locking tool, for example a male key, and an opposed cylindrical end 20 of revolution, the key serving to tighten the inner race 4 on a threaded shaft which is engaged in the thread 21 of the bore 4a.

The rolling bearing 5 includes two rows of rolling elements 22 and 23, for example balls, maintained at uniform circumferential spacings by means of cages 24, 25. The cages can be made of synthetic material and have an annular heel provided with compartments and claws in which the rolling elements 22, 23 are arranged. The rolling elements 22 are arranged between the raceway 10 of the outer race 3 and the raceway 16 of the inner race 4. The rolling elements 23 are arranged between the raceway 11 of the outer race 3 and the raceway 17 of the inner race 4. The two rows of rolling elements 22, 23 are symmetrical with respect to the radial plane 7. In other words, the radial planes 26, 27 passing through the centre of the rolling elements 22, 23 are equidistant from the radial plane 7. The resultant of the radial forces transmitted by the belt to the rim 2 and to the outer race 3 is transmitted to the inner race 4 via the rolling elements 22 and 23 with an identical distribution over the two raceways. There is thus no skew torque as would be the case if the resultant of the radial forces was situated outside the raceway or raceways. The operating conditions of the bearing are thus improved, and consequently its life is increased.

The freewheel 6 is arranged axially between the grooves 9 and 12 of the outer race 3 and radially between the outer race 3 and inner race 4. The freewheel 6 includes a row of lock-up elements 28, in this case cams, between the ground seat 15 of the outer race 3 and the ground seat 18 of the inner race 4. The lock-up elements 28 have an outer rounded surface for contact with the seat 15 and an inner rounded surface for contact with the seat 18. The freewheel 6 includes a cage 29, for example one made of metal sheet. The cage can have an annular general shape of U-shaped cross section, with an axial portion in which there are formed apertures 30 in which the lock-up elements 28 are arranged, and outwardly directed radial portions extending not far short of the bore 3a of the outer race 3. The freewheel includes a spring 31, for example a band spring likewise having compartments in which the lock-up elements 28 are arranged. The spring is arranged inside the cage 29 and is responsible for pivoting the lock-up elements into a friction position with respect to the seats 15 and 18.

Moreover, the cams are of the engaging type, that is to say tending to pivot in the lock-up direction under the effect of the centrifugal force caused by the rotation of the disengageable pulley 1.

The circlips 32 and 33 are respectively arranged in the grooves 13 and 14 formed in the bore 3a of the outer race 3. The circlips 32 and 33 project inwardly with respect to the bore 3a and are responsible for axially retaining the freewheel 6. In the event of a slight axial displacement of the freewheel 6, an outwardly directed radial edge flange forming part of the cage 29 can come into contact with one of the circlips, 32 or 33, thereby limiting such an axial displacement. As a result, the lock-up elements 28 remain well arranged between the ground seats 15 and 18 formed respectively on the outer race 3 and the inner race 4.

In the embodiment represented, the freewheel 6 is arranged axially beyond the active outer surface 2b of the rim 2. The rolling elements 22 and 23 are arranged axially at the level of the said active outer surface 2b of the rim 2. In other words, the rows of rolling elements 22 and 23 are arranged axially at the location where there is exerted the radial force due to the tension of the belt which is intended to be in contact with the rim 2, resulting in an efficient absorption of the forces transmitted by the rim 2.

Sealing between the races is provided by the seals 34 and 35 respectively mounted in the grooves 8 and 9 of the outer race 3, these seals having a lip which rubs on the respectively ground seats 4e and 4g of the outer surface 4b of the inner race 4. A seal 36 is mounted in the groove 12 of the outer race 3 and has a lip which rubs on the ground seat 4f of the outer surface 4b of the inner race 4. This produces a separation between the freewheel 6 and the rolling bearing 5 in terms of fluid communication. It is thus possible to provide a lubricant tailored to the rolling bearing between the seals 34 and 36 and a lubricant tailored to the freewheel 6 between the seals 35 and 36. The specific tailoring of each lubricant according to the requirements of a rolling bearing and to the requirements of a freewheel with cams makes it possible to increase the life of the disengageable pulley.

It can be observed that the axial dimension of the rim 2 is significantly less than that of the races 3 and 4. This results in a reduction in the overall size of the disengageable pulley and also in a reduction in the quantity of material used to form the rim, allowing a reduction in mass and in cost. The disengageable pulley has a very small number of parts, including many standardized parts.

Moreover, the disengageable pulley subassembly devoid of rim, in other words the subassembly formed by the outer race 3 and inner race 4, the rolling bearing 5 and the freewheel 6 equipped with the seals, can be standardized for a larger number of applications and, in particular, a larger number of pulley active outer surface diameters. The rim 2 can be chosen specifically according, for example, to the outside diameter and/or the width of the belt.

The inner bearing race is integrated with the hollow shaft, with which it forms one and the same part, thus making it possible to limit the stacking of parts, which proves to be radially space-consuming. The inner race includes within its bore the means required for mounting and fastening to a solid shaft, for example the alternator shaft. These means can take the form of splines or a thread.

The outer race has a very simple shape allowing very economic large-series machining, both in terms of the turning operation and of the heat treatment and grinding operations. The outer peripheral surface of the outer race is a simple cylinder of revolution having a uniform diameter over its whole length. It can therefore be machined particularly easily and economically. During the finishing operation, the outer surface of revolution of the outer race may be ground to give it its final geometry with the required precision. Given the simple cylindrical shape of the outer surface, the grinding operation can be performed under very economic conditions, for example on a large-series grinding machine of the "centreless" type.

The bore of the outer race is also a surface of revolution of generally cylindrical shape and with a constant diameter outside the region of the raceways and the grooves. The bore of the outer race can be internally ground, at least in the region of the seat for the cams, by supporting the race on the already-ground outer surface so as to ensure good concentricity between its surfaces of revolution. The raceways can likewise be ground simultaneously by resting the race on the already-ground outer surface. It is possible in this way to ensure economic machining of the outer race with excellent concentricity between the outside diameter, the raceway tracks and the contact seat for the cams.

The outer surface of the inner race is likewise a surface of revolution of generally cylindrical shape and with a constant diameter over its whole length outside the region of the raceways. Large-series grinding of the cylindrical parts is therefore straightforward. It is thus possible during the same operation to finish the contact seat for the cams and the contact seats for the seals. The raceways can then be ground simultaneously by resting the race on the already-ground cylindrical part. It is thus possible to ensure economic machining of the inner race with excellent concentricity between the raceway tracks and the contact seat for the cams.

The freewheel with cams is advantageous over other types of freewheels since the cams cooperate with the inner and outer cylindrical seats of revolution, these seats being easy to machine unlike other types of freewheels, in particular freewheels with rollers which require lock-up ramps to be formed on one of the two seats.

The rim of the pulley can be made of metal or synthetic material and mounted rigidly on the outer race using suitable means, such as sintering and/or adhesive bonding or overmoulding.

In addition to the aforementioned advantages relating to the manufacture and mounting of the various elements of the assembly, the disengageable pulley is modular and makes it possible on one and the same standardized subassembly, consisting of inner race, outer race, rolling bearing and freewheel, to mount a number of external dimensions of pulleys having the same bore. The disengageable pulley makes it possible, for a given outside diameter, to obtain a better load capacity than with an outer bearing race. The one-piece construction of the outer race on the one hand and of the inner race on the other hand makes it possible to obtain a high degree of strength while at the same time forming a large radial space for the cams and the rolling elements, resulting in the increased load capacity.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A disengageable pulley device comprising:
    a rim comprising a bore and an outer active surface provided with circular grooves and ribs;
    an outer race made in one piece of substantially tubular shape and having a bore and a cylindrical outer surface of revolution, said bore comprising two raceways of general toroidal shape, the bore of the rim being in contact with part of the outer surface of the outer race;
    an inner race made in one piece, forming a hollow shaft, said inner race having a bore and a cylindrical outer surface of revolution, said outer surface comprises two raceways situated in the same radial plane as the raceways of the outer race;
    a rolling bearing comprising two rows of rolling elements, each row of rolling elements being arranged between and in contact with one of the raceways of the outer race and one of the raceways of the inner race;
    a freewheel arranged radially between said outer and inner races, wherein the outer race comprises at least one contact seat of cylindrical revolution for lock-up elements of the freewheel, wherein the inner race comprises at least one contact seat of cylindrical revolution for the lock-up elements of the freewheel, and wherein the freewheel is in contact with the contact seats of the inner and outer races;
    wherein the rim is mounted on the subassembly formed by the outer race, the inner race, the rolling elements and the freewheel.

2. The device of claim 1, wherein the axial width of the outer race is greater than the axial width of the outer active surface of the rim.

3. The device of claim 1, wherein the rim is arranged axially on that side of the outer race where the raceway or raceways are situated.

4. The device of claim 1, wherein the rolling elements comprise balls, and/or the lock-up elements comprise cams.

5. The device of claim 1, wherein the lock-up elements comprise engaging cams.

6. The device of claim 1, wherein the outer surface of the inner race has a substantially uniform diameter outside the raceways.

7. The device of claim 1, wherein the rolling bearing and the outer active surface of the rim are symmetrical with respect to a common radial plane.

8. The device of claim 1, further comprising a seal arranged between the freewheel and the rolling bearing.

9. The device of claim 8, wherein the freewheel comprises a lubricant which differs from a lubricant of the rolling bearing.

* * * * *